United States Patent Office 3,769,394
Patented Oct. 30, 1973

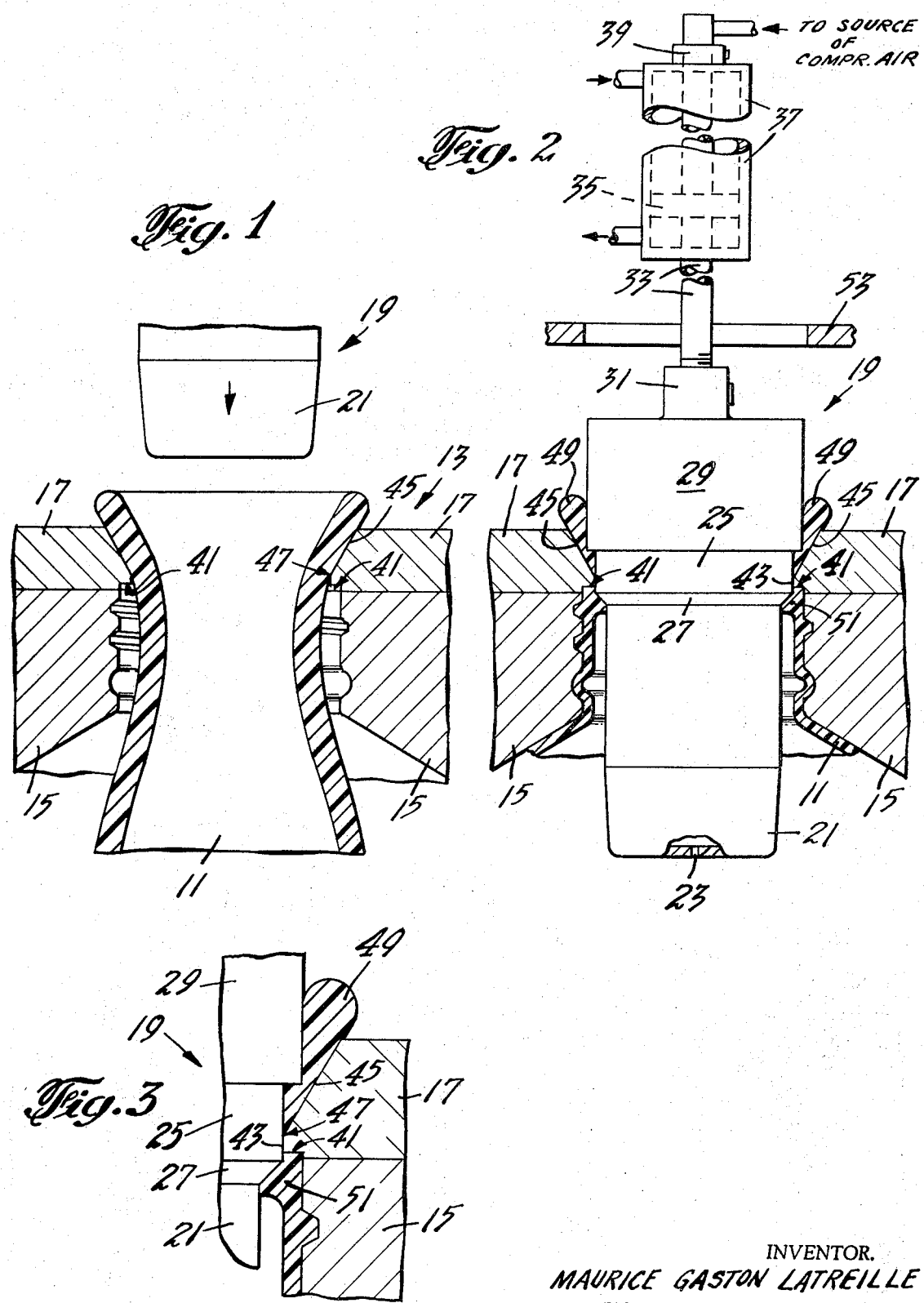

3,769,394
METHOD FOR FINISHING BLOW MOLDED PLASTIC CONTAINERS IN THE MOLD
Maurice Gaston Latreille, Batavia, Ill., assignor to American Can Company, Greenwich, Conn.
Filed Sept. 15, 1971, Ser. No. 180,714
Int. Cl. B29c 17/07, 17/12
U.S. Cl. 264—98                3 Claims

ABSTRACT OF THE DISCLOSURE

A method and apparatus for finishing the neck portion of a blow molded plastic container in the mold. A parison is aligned in a mold having an undercut in the flash or moil forming cavity. The flash or moil is then sheared above the undercut by a plunger, whose further descent into the parison provides a mold for the sealing surface and the inside and outside neck surfaces adjacent the sealing surface. The descending plunger substantially finish forms the sealing surface and the adjacent neck surfaces.

BACKGROUND OF THE INVENTION

The present invention relates to blow molded plastic containers and more particularly to in-mold neck finishing of blow molded plastic containers.

There are known today various methods and apparatus for blow molding plastic containers. However each of these methods and apparatus has at least one of the following shortcomings which render it troublesome:

(1) A rounded outer surface on the lip is not always obtained. Because prior art methods involve shearing of the parison at or across the container lip, the container lip does not possess a rounded outer surface. The present invention combines molding techniques with mold design to produce rounded outer surfaces on the container lip.

(2) Constant quality of the sealing surface is not attainable because it is made by a cutting plunger butting against an anvil. As the plunger or anvil wears out, flash appears on the outside of the lip at the sealing surface. It is also possible that the plunger may not reach the anvil if there is insufficient pressure, the net result being large flash left on the container lip or an unfinished neck. The instant invention employs an undercut in the flash or moil forming portion of the mold so that the sealing surface is made in the mold. A constant quality of the sealing surface is thereby attainable with the present invention. Even if the plunger or anvil should wear, or the pressure on the plunger decrease, any flash that might develop would be on the inside of the lip, below the sealing surface, and thus would not affect the appearance or operability of the container.

(3) The inner diameter of the flash or moil is larger than the outer diameter of the container neck, thereby permitting the flash or moil to slip over the neck of the container when stripping the container from the molding apparatus. In the instant invention, the inner diameter of the flash or moil is smaller than the outer diameter of the container neck, so that the flash or moil cannot slip over the container neck during the stripping operation. In fact, the instant invention completely eliminates the need for a separate flash or moil removal step, as the flash or moil is necessarily separated from the finished container in the stripping operation due to its smaller inner diameter.

(4) A cutting plunger butts against an anvil, creating direct metal-to-metal contact under high pressure. This pressure is transferred to the mold as well as to the tie rods, thus flexing the tie rods. The present invention involves only a sliding contact between the anvil and plunger, as it employs a no-clearance fit to effect a shearing of the parison. The present invention thus avoids flexing of the tie rods and frequent sharpening or repairs and/or replacement of the plunger and anvil.

SUMMARY OF THE INVENTION

The present invention overcomes all the problems outlined above by providing a method of finishing the neck portion of a blow molded plastic container in the mold. The method comprises several steps, starting with extruding a plastic parison from an extrusion nozzle and aligning the parison in a mold having neck, body and flash or moil forming cavities, the flash forming cavity being positioned above the neck forming cavity and having a diameter smaller than the diameter of the neck forming cavity. The next step consists of closing the mold about the parison and gripping the peripheral surface of the parison with the flash or moil forming portion of the mold, thereby supporting the parison in the mold. Thereafter, a plunger whose diameter is substantially equal to the diameter of the flash or moil forming cavity is axially advanced to a point below the intersection of the flash forming and neck forming cavities, thereby shearing the flash or moil from the parison and substantially finish forming the sealing surface of the container neck and the interior and exterior surfaces of the container neck adjacent the sealing surface. The final step consists of blow molding the remainder of the parison to form the container with a finished neck portion.

BRIEF DESCRIPTION OF THE DRAWINGS

FIG. 1 is a fragmentary, central, vertical, sectional view of the plastic parison and closed mold before the blow-pin assembly, shown in elevation, is lowered.

FIG. 2 is similar to FIG. 1 except that it shows the parison and resultant flash after the blowpin assembly has been lowered into molding position and the parison has been blow molded to form a container.

FIG. 3 is an enlarged, fragmentary, central, vertical, sectional view of the parison and flash or moil shown in FIG. 2.

DESCRIPTION OF THE PREFERRED EMBODIMENT

Reference is now made to the drawings in describing the preferred embodiment of the present invention. In the process of blow molding plastic containers, a plasticized material, such as polyethylene, is extruded in tubular form through an extrusion nozzle (not shown). The tubular material or parison 11, is then aligned in a mold 13 which consists of a body forming portion (not shown), a neck forming portion 15 and a flash or moil forming portion or anvil 17. The mold 13 is then closed about the lower end of the parison 11 (not shown) in conventional manner, thereby gripping the upper peripheral surface of the parison 11 by contact with the flash forming portion 17 of the mold 13. After the parison 11 is gripped by the closed mold 15, the parison 11 is severed from the extrusion nozzle by a wire or the like (not shown). The extrusion nozzle is then removed from alignment with the mold 13 and a blowpin assembly 19 is aligned therewith in conventional manner. FIG. 1 illustrates the contour of the parison 11 before the blowpin assembly 19 is lowered.

The blowpin assembly 19 (FIG. 2 includes a blowing tip 21 having a blow hole 23 which allows compressed air to be injected internally of the parison 11, a plunger 25 with a tapered lower portion 27, and a stop cylinder 29. The stop cylinder 29 is fixed to a hollow piston rod 33 by a collar 31. The rod 33 is conventionally fixed to a piston 35 which is capable of reciprocable movement within an hydraulic cylinder 37. An upper collar 39 is mounted on the upper extremity of the rod 33. Fluid entering and leaving the hydraulic cylinder 37 drives the piston 35 up and down, which in turn raises and lowers the rod 33 and the blowpin assembly 19. The limits of the stroke of the blowpin assembly 19 are controlled by the cylinder 37. The hollow rod 33 also serves to provide a passageway for the compressed air to the blow hole 23 from the source of the compressed air. It is thus apparent that none of the molding apparatus is subjected to any butting pressure or direct metal to metal contact.

Subsequent to proper alignment (FIG. 1) of the blowpin assembly 19, the piston 35 causes the assembly 19 to be lowered to the blowing position shown in FIG. 2. As can be seen in FIGS. 1 and 3, the anvil 17 is provided with an undercut 41 adjacent the straight, lower portion 43, and an outwardly tapered upper portion 45. The neck forming portion 15 of the mold 13 is recessed from the straight, lower portion 43 of the anvil 17. The diameter of the plunger 25 is substantially equal to the diameter of the straight, lower portion 43 of the anvil 17, so that sliding contact is effected as the plunger 25 is lowered below the undercut 41 of the anvil 17. The descending plunger thus shears the parison along the anvil 17 at the juncture 47 (FIG. 3) of the straight, lower portion 43 and the tapered, upper portion 45. The shearing of the parison 11 creates flash or moil 49, which is seen to be separated from the container-forming parison 11 even before the parison is blown to its ultimate shape. This early separation eliminates all the problems associated with flash or moil removal after container formation.

As the plunger 25 approaches the molding position of FIG. 2 after it has sheared the parison 11, it pushes the remainder of the parison 11 in its path downward to create a thickened lip 51. The amount of parison 11 that is in effect extruded into the lip 51 depends on the original thickness of the parison 11. The tapered lower plunger portion 27 and blowing tip 21 provide molding surfaces to shape the interior lip surfaces. It is thus apparent that once the plunger 25 is brought to rest as shown in FIGS. 2 and 3, the undercut 41 has finish formed the sealing surface of the neck, the tapered lower plunger portion 27 and blowing tip 21 have finish formed the interior surfaces of the lip 51, and the anvil 17 and neck forming portion 15 of the mold 13 have finish formed the exterior surface of the lip 51. After the plunger 25 has been lowered, compressed air is blown through the hollow piston rod 33 and blow hole 23 into the interior of the parison 11, to blow mold the parison into the desired container shape. It can be seen that the inner diameter of the flash or moil 49 is less than the outer diameter of the lip 51, so that when the mold 13 is opened after the blow molding operation and the blowpin assembly 19 is raised through a stripping plate 53, the flash or moil 49 cannot slip over the lip 51 but must fall away from the formed container.

It is thought that the invention and many of its attendant advantages will be understood from the foregoing description and it will be apparent that various changes may be made in the form, construction and arrangement of the parts of the article and that changes may be made in the steps of the method described and their order of accomplishment without departing from the spirit and scope of the invention or sacrificing all of its material advantages, the form hereinbefore described being merely a preferred embodiment thereof.

What is claimed is:

1. A method of mold finishing the neck portion of a blow molded, plastic container in the mold, comprising the steps of:

extruding a plastic parison from an extrusion nozzle;

aligning the parison in a mold having neck, body and flash forming cavities, the flash forming cavity being positioned above the neck forming cavity and having a diameter smaller than the diameter of the neck forming cavity, and wherein the diameter of the upper portion of the flash forming cavity gradually increases upwardly and the diameter of the lower portion of the flash forming cavity is longitudinally constant;

closing the mold about the parison and gripping the peripheral surface of the parison with the flash forming portion of the mold, thereby supporting the parison in the mold;

axially advancing a plunger whose diameter is longitudinally constant and substantially equal to the diameter of the lower portion of the flash forming cavity to a point below the intersection of the flash forming and neck forming cavities, thereby displacing parison material from the flash forming cavity to the neck forming cavity and shearing the flash from the parison at a point above the intersection of the flash forming and neck forming cavities, and substantially mold finish forming the sealing surface of the container neck and the interior surfaces of the container neck adjacent the sealing surface; and blow molding the remainder of the parison to form the container with a mold finished neck portion.

2. The method of claim 1 wherein the advance of the plunger is stopped by means external to the mold, whereby there is only sliding contact between the mold and plunger.

3. The method of claim 2 wherein the plunger additionally comprises a downwardly tapered portion below the longitudinally constant portion, thereby providing a container with a lip thicker than the remaining neck portion of the container.

References Cited

UNITED STATES PATENTS

| | | | |
|---|---|---|---|
| 3,657,406 | 4/1972 | Delebarre | 264—98 |
| 3,311,950 | 4/1967 | Strauss | 264—98 |
| 3,681,486 | 8/1972 | Mehnert | 264—99 |

ROBERT F. WHITE, Primary Examiner

T. E. BALHOFF, Assistant Examiner

U.S. Cl. X.R.

264—161; 425—297, 305 B, 326 B, 387 B